(12) United States Patent  (10) Patent No.: US 7,765,281 B1
Crow et al.  (45) Date of Patent: Jul. 27, 2010

(54) LARGE-SCALE TARGETED DATA DISTRIBUTION SYSTEM

(75) Inventors: James J. Crow, Austin, TX (US); James F. Kelton, Liberty Hill, TX (US); Arabinda Bose, Cedar Park, TX (US); Jeremy D. Remington, Austin, TX (US); Casey P. Schmit, Austin, TX (US); Amarjit Singh, Austin, TX (US)

(73) Assignee: Motive, Inc., Austin, TX (US)

( * ) Notice: Subject to any disclaimer, the term of this patent is extended or adjusted under 35 U.S.C. 154(b) by 1015 days.

(21) Appl. No.: 10/715,928

(22) Filed: Nov. 18, 2003

Related U.S. Application Data

(60) Provisional application No. 60/453,406, filed on Mar. 10, 2003.

(51) Int. Cl.
G06F 15/16 (2006.01)
G06F 9/44 (2006.01)
(52) U.S. Cl. .................................. 709/219; 717/173
(58) Field of Classification Search ................ 717/171, 717/172, 173; 709/218–219
See application file for complete search history.

(56) References Cited

U.S. PATENT DOCUMENTS

| | | | |
|---|---|---|---|
| 5,838,907 A * | 11/1998 | Hansen | 709/220 |
| 5,852,722 A | 12/1998 | Hamilton | 395/200.51 |
| 5,901,352 A | 5/1999 | St-Pierre et al. | 455/426 |
| 5,920,725 A * | 7/1999 | Ma et al. | 717/171 |
| 5,933,646 A | 8/1999 | Hendrickson et al. | 395/712 |
| 5,933,647 A * | 8/1999 | Aronberg et al. | 717/178 |
| 5,951,694 A | 9/1999 | Choquier et al. | 714/15 |
| 5,995,999 A | 11/1999 | Bharadhwaj | 709/200 |
| 6,067,568 A | 5/2000 | Li et al. | 709/223 |

(Continued)

FOREIGN PATENT DOCUMENTS

JP 02001117932 A 4/2001

(Continued)

OTHER PUBLICATIONS

Welcome to AOL.com, http://web.archive.org/web/19981201225748/http://www.aol.com/, © 1998 America Online, Inc., 2 pages (printed Dec. 1, 2003.

(Continued)

*Primary Examiner*—Larry Donaghue
(74) *Attorney, Agent, or Firm*—Hitt Gaines, PC (57) ABSTRACT

A method, system, computer system and computer program product to distribute data to arbitrarily large subsets of a very large client base, with each client computer system running client software referred to as an agent. The data distribution system uses minimal server resources and a large-scale network such as the Internet. The data to be distributed may include, for example, agent software configuration data; agent software programs, plug-ins, and associated data; announcements; and other data that is centrally managed by an administrator. Using this invention, millions of client computer systems, such as computer systems for subscribers to a broadband service, can be configured and managed centrally, while allowing data to be distributed to all or a subset of subscribers efficiently and using minimal bandwidth. Agents assist in determining whether particular data are to be distributed to them, enabling much larger-scale applications to be supported with limited server-side resources.

31 Claims, 6 Drawing Sheets

U.S. PATENT DOCUMENTS

| | | | |
|---|---|---|---|
| 6,085,120 A | 7/2000 | Schwerdtfeger et al. | 700/90 |
| 6,112,323 A * | 8/2000 | Meizlik et al. | 714/749 |
| 6,128,293 A | 10/2000 | Pfeffer | 370/359 |
| 6,138,158 A | 10/2000 | Boyle et al. | 709/225 |
| 6,173,326 B1 | 1/2001 | Collins | 709/229 |
| 6,188,888 B1 | 2/2001 | Bartle et al. | 455/417 |
| 6,199,104 B1 | 3/2001 | Delph | 709/208 |
| 6,209,125 B1 | 3/2001 | Hamilton et al. | 717/4 |
| 6,215,855 B1 | 4/2001 | Schneider | 379/22 |
| 6,237,135 B1 | 5/2001 | Timbol | 717/1 |
| 6,249,578 B1 | 6/2001 | Gilles et al. | 379/221 |
| 6,256,772 B1 | 7/2001 | Apte et al. | 717/1 |
| 6,279,125 B1 | 8/2001 | Klein | 714/38 |
| 6,285,983 B1 | 9/2001 | Jenkins | 705/10 |
| 6,289,381 B1 | 9/2001 | Brodigan | 709/225 |
| 6,298,353 B1 | 10/2001 | Apte | 707/103 |
| 6,324,619 B1 | 11/2001 | Raverdy et al. | 711/11 |
| 6,330,006 B1 | 12/2001 | Goodisman | 345/762 |
| 6,381,742 B2 | 4/2002 | Forbes et al. | 717/11 |
| 6,438,744 B2 | 8/2002 | Toutonghi et al. | 717/137 |
| 6,459,773 B1 | 10/2002 | Posthuma | 379/1.04 |
| 6,463,078 B1 | 10/2002 | Engstrom et al. | 370/466 |
| 6,463,079 B2 | 10/2002 | Sundaresan et al. | 370/468 |
| 6,463,578 B1 | 10/2002 | Johnson | 717/124 |
| 6,470,074 B2 | 10/2002 | Teixeria | 379/32.04 |
| 6,473,791 B1 | 10/2002 | Al-Ghosein et al. | 709/217 |
| 6,477,580 B1 | 11/2002 | Bowman-Amuah | 709/231 |
| 6,490,722 B1 | 12/2002 | Barton et al. | 717/174 |
| 6,529,511 B1 | 3/2003 | Du et al. | 370/397 |
| 6,560,213 B1 | 5/2003 | Izadpanah et al. | 370/338 |
| 6,560,704 B2 | 5/2003 | Dieterman et al. | 713/100 |
| 6,564,377 B1 | 5/2003 | Jayasimha et al. | 717/174 |
| 6,636,329 B2 | 10/2003 | Koppich et al. | 358/1.15 |
| 6,636,505 B1 | 10/2003 | Wang et al. | 370/352 |
| 6,640,239 B1 | 10/2003 | Gidwani | 709/203 |
| 6,651,249 B2 * | 11/2003 | Waldin et al. | 717/172 |
| 6,684,242 B1 | 1/2004 | Bahlmann | 709/222 |
| 6,694,350 B2 | 2/2004 | Kurashima et al. | 709/203 |
| 6,704,927 B1 | 3/2004 | Bak et al. | 717/151 |
| 6,986,134 B1 * | 1/2006 | Foster | 717/177 |
| 2001/0020249 A1 | 9/2001 | Shim | 709/220 |
| 2002/0095400 A1 | 7/2002 | Johnson et al. | 707/1 |
| 2004/0003390 A1 * | 1/2004 | Canter et al. | 717/173 |
| 2004/0088698 A1 * | 5/2004 | Claiborne | 717/174 |
| 2005/0289535 A1 * | 12/2005 | Murray et al. | 717/172 |

FOREIGN PATENT DOCUMENTS

| | | | |
|---|---|---|---|
| WO | WO9903036 | 1/1999 | 09/46 |

OTHER PUBLICATIONS

American Online Software Version 5.0 Screenshots, 8 pages.

* cited by examiner

Fig. 6
Example Index File

LARGE-SCALE TARGETED DATA DISTRIBUTION SYSTEM

CROSS-REFERENCES TO RELATED APPLICATIONS

This application claims the benefit of priority based on U.S. Provisional Patent Application Ser. No. 60/453,406, filed Mar. 10, 2003, entitled "Large-Scale Targeted Data Distribution System," and naming James J. Crow, James F. Kelton, Arabinda Bose, Jeremy Remington, Casey Schmit, and Amarjit Singh as the inventors. The above-referenced application is hereby incorporated by reference herein in its entirety.

This application is related to U.S. patent application Ser. No. 09/542,602, filed Apr. 4, 2000, entitled "Broadband Service Control Network," and naming James J. Crow and Dermis L. Parker as the inventors.

This application is related to U.S. patent application Ser. No. 09/542,274, filed Apr. 4, 2000, entitled "Self-Managing Software Agents With Introspection," and naming James J. Crow and Dennis L. Parker as the inventors.

This application is related to U.S. patent application Ser. No. 09/542,273, filed Apr. 4, 2000, entitled "Distributed Services Architecture Through Use Of A Dynamic Service Point Map," and naming James J. Crow and Dennis L. Parker as the inventors.

This application is related to U.S. patent application Ser. No. 09/653,486, filed Aug. 31, 2000, entitled "System of Automated Configuration of Network Subscribers for Broadband Communication," and naming James J. Crow as the inventor.

Each of the above-referenced applications is hereby incorporated by reference herein in its entirety.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to communication between clients and servers in a large-scale distributed client/server system.

2. Description of the Related Art

Computer component manufacturers, software developers, and Internet service providers ("ISPs") continue to develop technology that increases the speed of Internet communication. The emergence of broadband technology, including DSL (digital subscriber lines), ISDN (integrated services digital network), and other broadband communication schemes are due in large part to this common goal. Many software developers are now re-designing existing software to take advantage of new Internet technologies.

User computers must be configured to access broadband Internet communication. Typically, a special modem must be configured, appropriate drivers installed, accounts established and other steps taken to implement the communication link. Moreover, because computer systems are very seldom sold ready for broadband communication, configuration often requires a service person to visit the physical location of the computer to configure it for access to a broadband network.

Rather than send service personnel, broadband service providers have begun to provide client software to be installed on subscribers' computer systems. This client software, also referred to herein as an agent, enables a user to configure access to broadband services automatically, i.e., without the need for a service person to be onsite. The agent solution works well for basic modem installation and configuration. However, the agent must be updated so that the computers, in which the agent is installed, can take advantage of changes to broadband services offered. Accordingly, a need exists to centrally manage and automatically update these agents or other application programs on each of the subscribers' computer systems.

Central management of agents can be performed by a server in communication with client computer systems that contain the agent. One problem in achieving such central management is that at Internet scales, it is impractical for the server to maintain persistent connections to a very large number of clients. Also, in the modern networking world, firewalls, Port Address Translators, Network Address Translators, and the like make it impractical for a server to contact its clients. Furthermore, a large scale deployment of intermittently connected clients requires synchronization of software and configuration information for each client when that client establishes a connection with the server.

A model has been used where the clients periodically poll one or more servers. Servers process each request as it is received, but individually providing a response to each of millions of clients requires significant server hardware and a significant database investment, in addition to the costs of personnel to maintain such a large system.

Broadcasting technology enables servers to broadcast messages to a very large number of clients. However, the bandwidth requirement to send messages to millions of clients can severely degrade network performance. It is desirable to have the capability to provide a message or set of data to an arbitrarily large subset of clients without degrading network performance.

To achieve Internet scales, it may be necessary to provide multiple, equivalent servers to share the load. Clients should see the group of servers as a single source. A large group of servers presents management challenges to server administrators. Common server software and system state information should be efficiently maintained and communicated to all servers, while preserving the clients' unified view.

Furthermore, many large-scale client/server applications require configuration data on the client to correctly operate. This configuration data may evolve as the network environment and business needs change. It is desirable to proactively deliver configuration data to distributed clients by a central administrator as configuration data evolves. In addition, the capability should exist for administrators to post information to the users of broadband networks. Mechanisms exist that rely on user action, but it is desirable that an administrator be able to proactively post generally applicable information onto users' desktops in a large-scale deployment of client computers.

A solution is needed that allows data to be distributed to a very large client base using minimal server resources. The solution should be scalable, efficient, and capable of using a publicly available network, such as the Internet, for distributing data.

SUMMARY OF THE INVENTION

The present invention is used to distribute data to arbitrarily large subsets of a very large client base, with most or each client computer system of the client base running client software referred to as an agent. The data distribution system uses a large-scale network such as the Internet. The data to be distributed may include, for example, agent software configuration data; agent software programs, plug-ins, and associated data; announcements; and other data that is centrally managed by an administrator. Using this invention, millions of client computer systems, such as computer systems for subscribers to a broadband service, can be configured or managed centrally, while allowing data to be distributed to all or a subset of subscribers efficiently and using minimal bandwidth. Agents may assist in determining whether particular data are to be distributed to them, enabling much larger-scale applications to be supported with limited server-side resources.

BRIEF DESCRIPTION OF THE DRAWINGS

The present invention may be better understood, and its numerous objectives, features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

Introduction

The present invention provides a method, system, computer system, or computer program product to distribute data from server to client computer systems. Clients may assist in determining whether particular data are to be distributed to them.

Various services may cooperate to help administrators manage a large-scale deployment of clients as described in patent application Ser. No. 09/542,602, entitled "Broadband Service Control Network," and naming as inventors James J. Crow and Dennis L. Parker. These services provide a way for the infrastructure to be managed.

Architecture of an Example Large-Scale Data Distribution System

Figure 1:
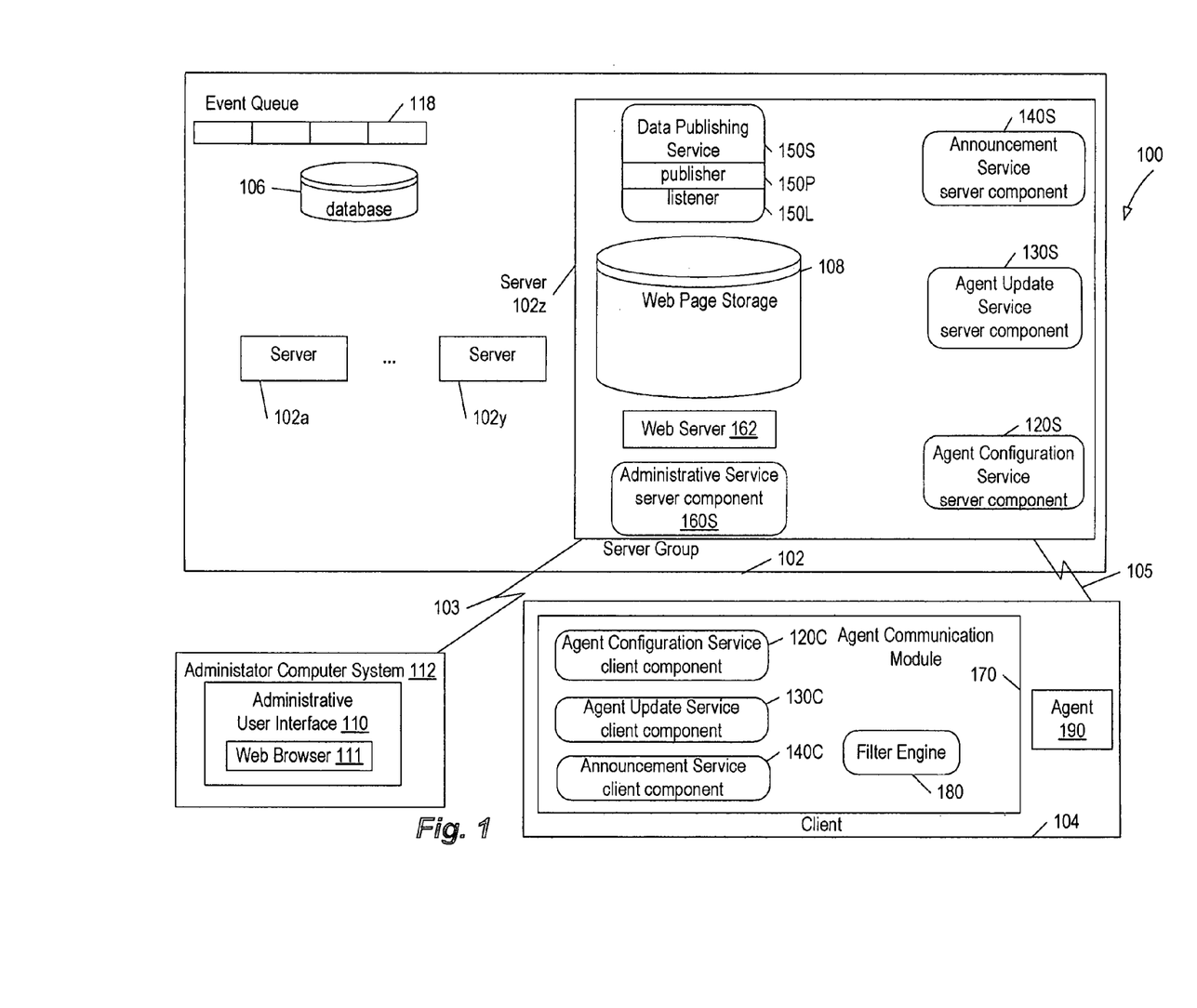
FIG. 1 shows an example of a large-scale data distribution system in which the present invention may operate.

FIG. 1 shows relevant components of an exemplary large-scale data distribution system 100 in which the present invention may operate. Client 104 is an example embodiment of one of a very large number of client computer systems in system 100. Client computer system 104 includes a processor (not shown), and a memory (not shown) in which software components, such as agent communication module 170 and agent 190, operate. Agent 190 is an example of client software running on client computer systems of a client/server system, such as data distribution system 100 or the broadband service control network described in the patent applications referenced in the "Cross References to Related Applications" section of this document. Agent communication module 170 enables communication between agent 190 and server computer systems, such as servers 102a, 102y, and 102z of server group 102, and is described in further detail below.

Server group 102 may include one or more servers, depending upon the number of client computer systems/agents that are supported in data distribution system 100. Each of the server computer systems 102a, 102y, and 102z in server group 102 has a processor (not shown) and a memory (not shown) in which software components can run. In one embodiment, each server computer system in server group 102 provides substantially identical functionality and includes substantially identical components. Examples of these components are shown within server 102z and are described in further detail below.

In the embodiment shown, server group 102 represents a server farm or cluster, where server computer systems 102a, 102y, and 102z share a hostname and other resources. The location of particular data is provided as a Uniform Resource Locator (URL) accessible in server group 102, and any one of servers 102a, 102y, and 102z can provide that particular data to an agent requesting it. This embodiment enables load balancing to manage a very large number of agents with as few servers as possible in server group 102. In one embodiment, data to be distributed are stored as static web pages in web page storage 108.

Client computer system 104 communicates with one of server computer systems 102a, 102y, or 102z in server group 102 via a communication link, such as communication link 105 between client computer system 104 and server 102z. In one embodiment, communication link 105 is implemented via an Internet connection.

Administrative computer system 112 hosts administrative interface 110, which uses web browser 111. Administrative interface 110 can be used, for example, to provide data for indirect distribution to agents, such as agent 190, in data distribution system 100. Typically, data to be communicated are provided in the form of a data file or a message. Administrative computer system 112 can also communicate with one or more of server computer systems 102a, 102y, and 102z in server group 102 via a communication link, such as the communication link 103 between administrative computer system 112 and server 102z. Communication link 103 can be implemented, for example, as an intranet, as a connection to a local area network for servers 102a, 102y, and 102z in server group 102, as an Internet connection, or in other ways known to those skilled in the art.

In the embodiment illustrated, each of the server computer systems in server group 102 has access to shared resources, such as database 106 and event queue 118. These shared resources are used to communicate data between server computer systems in server group 102. The data communicated between server computer systems may include data to be distributed to agents (e.g., agent 190) and/or other servers. One of skill in the art will readily understand that information can be made commonly available to servers in a client/server system using shared resources implemented in a variety of ways. The present invention is not limited to use of a database or an event queue, as long as data for distribution can be made commonly available to a group of servers in a client/server system.

Server 102z provides an example embodiment of a server operating in data distribution system 100. Server 102z includes server component 120S (also designated as Agent Configuration Service server component 120S), server component 130S (also designated as an Agent Update Service server component 130S), server component 140S (also designated as an Announcement Service server component 140S), and server component 160S (also designated as an Administrative Service server component 160S). Server 102z also includes a Data Publishing Service 150S used for communicating between servers in server group 102. Data Publishing Service 150S includes a publisher component 150P and a listener component 150L.

Server 102z also includes a web server 162. In one embodiment, Administrative Service server component 1605 provides a web-based application that uses web server 162 to serve web pages from web page storage 108. One of skill in the art will understand that a single web server may provide server components for multiple services, such as 120S, 130S, 140S, and 160S. In addition, web server 162 may reside on a different server computer system than server 102z, and the servers in server group 102 may use the same or different web servers. Furthermore, web page storage 108 need not reside on server 102z itself, but may reside on a separate storage device accessible by server 102z.

Each of the server components 120S, 130S, and 140S has a respective client component on client computer system 104. These client components include, respectively, Agent Configuration Service client component 120C, Agent Update Service client component 130C, and Announcement Service client component 140C. Each service is described in further detail below. One of ordinary skill in the art will recognize that these are three examples of services for distributing respective types of data, and that services distributing other types of data are also within the scope of the invention.

Referring again to client computer system 104, in one embodiment, agent communication module 170 acts as a container including instructions implementing each of the service client components 120C, 130C, and 140C. Agent communication module 170 also includes filter engine 180, which processes data as explained in further detail below.

In one embodiment, agent communication module 170 is implemented as a process that runs on a client computer system hosting an agent, even when the respective agent is not active. The service client components within agent communication module 170 are examples of service client components, but agent communication module 170 may include other service client components for distributing different types of data.

Each of these service client components 120C, 130C, and 140C provides code to implement service-specific functionality. In one embodiment, this code is provided in the form of an application programming interface (API). Agent 190 is configured to periodically request respective service-specific data stored at a pre-specified location in server group 102, as well as to request respective service-specific data upon starting.

The operation of the Agent Configuration Service is described in further detail below as an example of distributing one type of data in data distribution system 100.

Agent Configuration Service

Client application programs, such as agent 190, use configuration data describing how to perform their duties. For example, configuration data, stored in the Windows Registry by most software applications running in the Windows operating system, controls the application's behavior with regard to visual display or user preferences. Broadband applications may also use configuration data to control how they manage, monitor, and use the broadband network. Configuration data are subject to change as the environment and business needs change. Agent Configuration Service server component 120S makes configuration data available for retrieval by Agent Configuration Service client component 120C.

Figure 2:
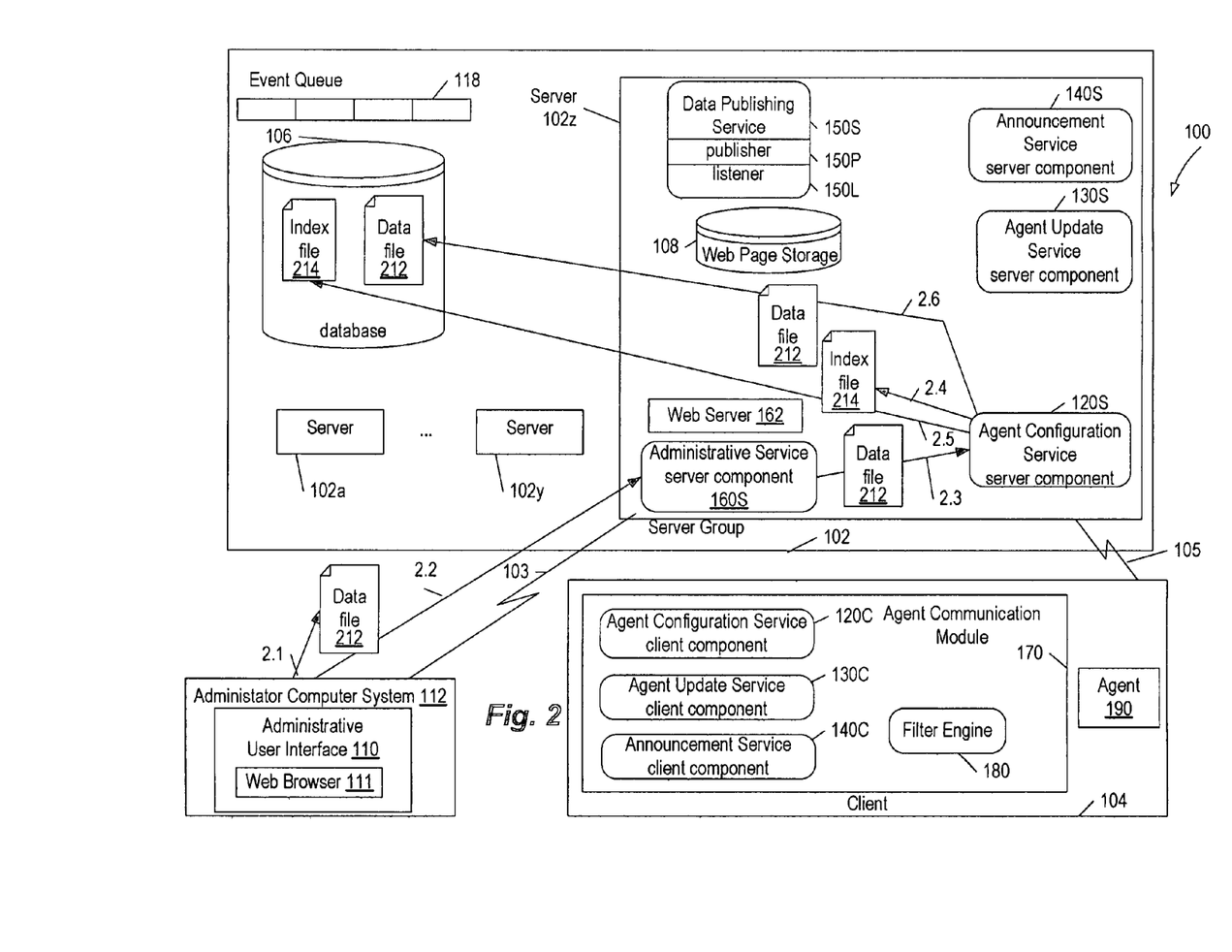
FIG. 2 shows examples of data flows preparing data to be distributed in the large-scale data distribution system of FIG. 1.

FIG. 2 shows examples of data flows for preparing service-specific data for distribution within the large-scale data distribution system 100 of FIG. 1. In this example, data file 212 and index file 214, providing further information about data file 212, are examples of service-specific data.

In action 2.1, administrative interface 110 is used to prepare data file 212 to be distributed to a subset of all agents, including agent 190 on client computer system 104. In one embodiment, administrative interface 110 includes a web browser 111 for communicating with Administrative Service server component 160S. In action 2.2, administrative interface 110 provides data file 212 to Administrative Service server component 160S. In action 2.3, Administrative Service server component 160S determines that data file 212 includes configuration data and provides data file 212 to Agent Configuration Service server component 120S.

In action 2.4, Administrative Service server component 160S uses information about data file 212 to update index file 214. Updating index file 214 may include creating index file 214 if index file 214 does not already exist, or updating data in index file 214. In action 2.5, Agent Configuration Service server component 120S stores index file 214 in shared database 106, and in action 2.6, Agent Configuration Service server component 120S stores data file 212 in shared database 106. Data file 212 and index file 214 are now ready for distribution to servers in server group 102.

Figure 3:
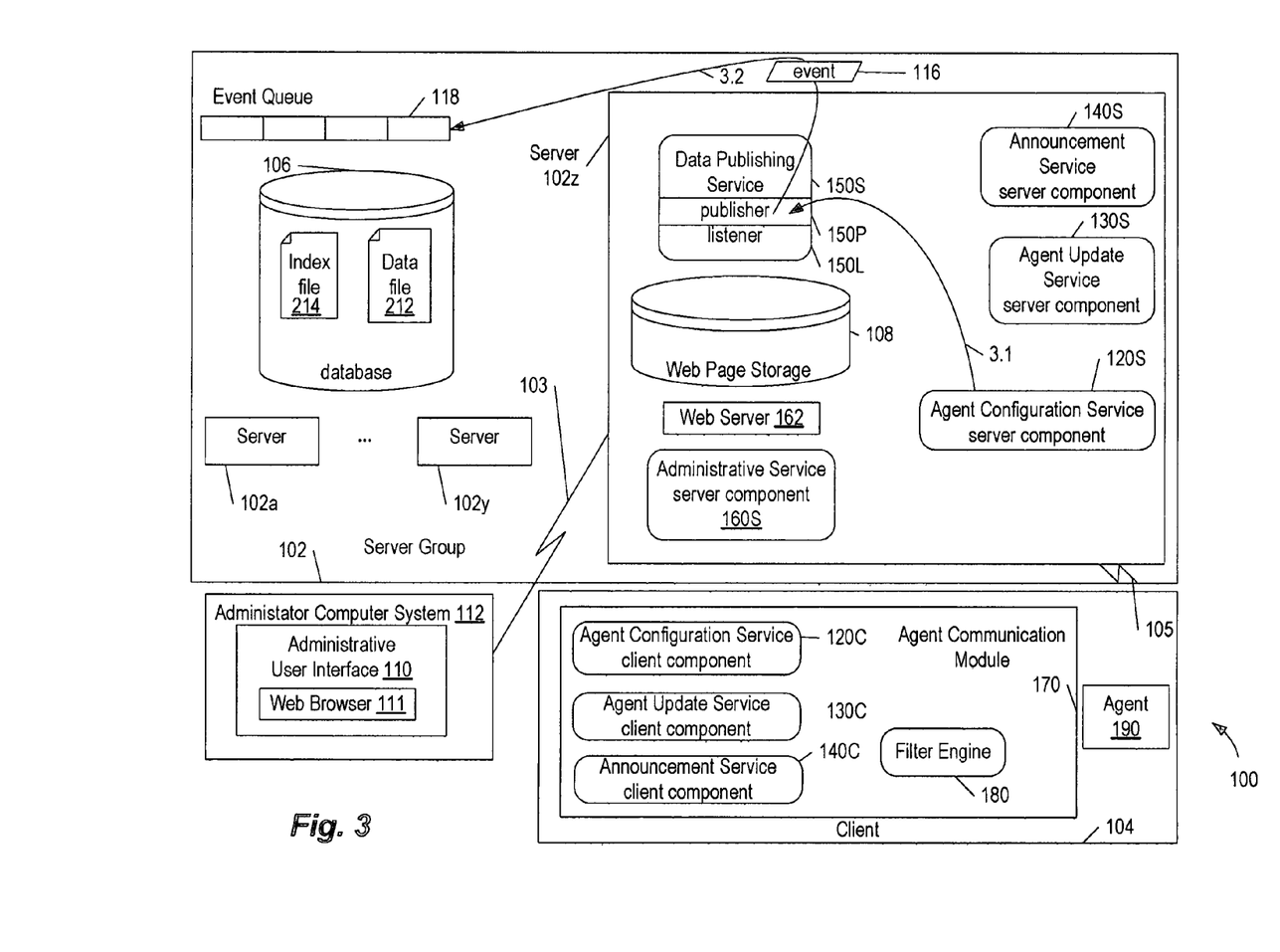
FIG. 3 shows examples of data flows making data available to the servers of the large-scale distributed client/server system of FIG. 1.

FIG. 3 shows examples of data flows used for making data available to the servers of the large-scale data distribution system 100. When an administrator or a server application, such as Agent Configuration Service server component 120S, has new data to be published for distribution to agents, the server application or administrator connects to the Data Publishing Service publisher running on its respective server. For example, in action 3.1, Agent Configuration Service server component 120S notifies publisher 150P that data file 212 and index file 214 are available for publication. In action 3.2, publisher 150P posts an event 116 to event queue 118. One of skill in the art will recognize that other techniques can be used for communicating that data are available for distribution.

Figure 4:
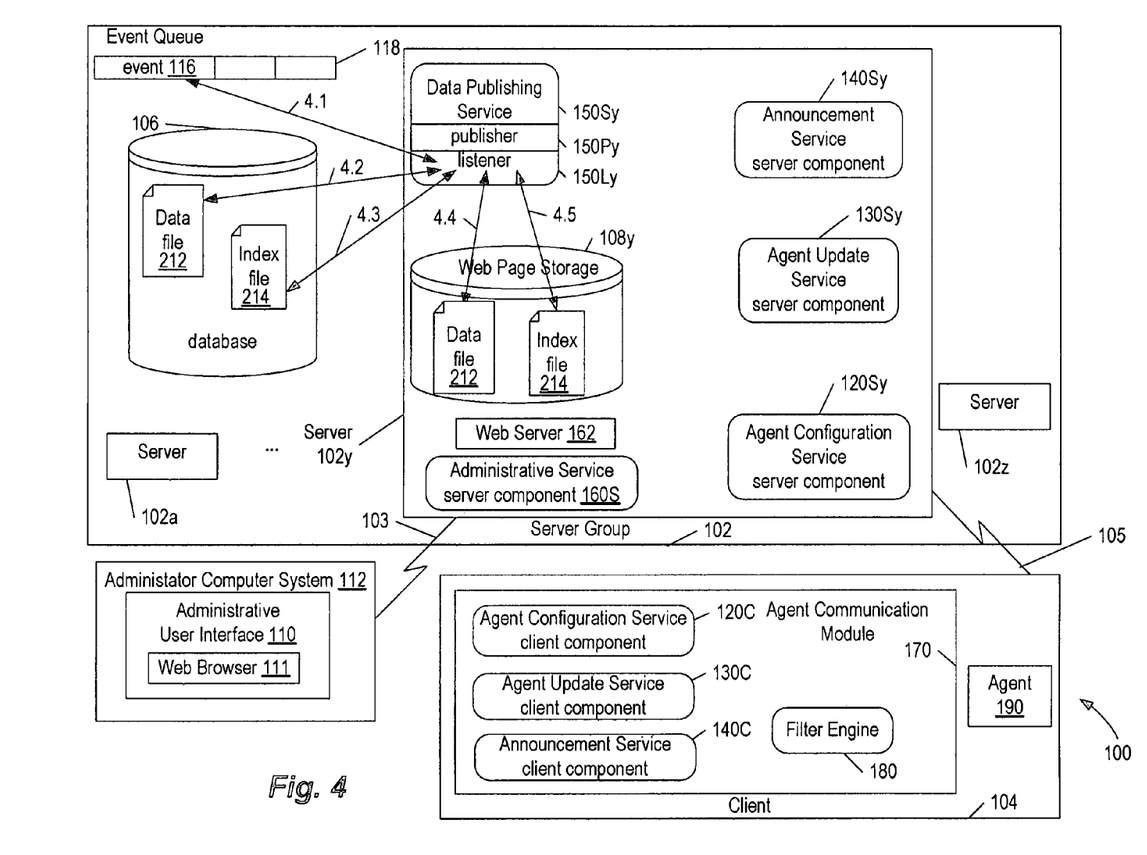
FIG. 4 shows examples of data flows distributing a data file to the servers of the large-scale distributed client/server system of FIG. 1.

FIG. 4 shows examples of data flows for distributing data to servers in server group 102 of the large-scale data distribution system 100. Each of servers 102a and 102y has similar components to those of server 102z shown in FIGS. 1 through 3; for example, Data Publishing Service 150Sy on server 102y corresponds to Data Publishing Service 150S on server 102z. Similarly, Data Publishing Service 150Sy includes respective publisher 150Py and listener 150Ly.

Respective Data Publishing Service listeners on each server in server group 102 continuously listen for events to be posted to event queue 118. In action 4.1, listener 150Ly detects that event 116 has been posted in event queue 118 (as described above with respect to FIG. 3). In action 4.2, listener 150Ly retrieves data file 212 from database 106, and in action 4.3, listener 150Ly retrieves index file 214 from database 106. In action 4.4, listener 150Ly writes index file 214 into web page storage 108y, and in action 4.5, listener 150Ly writes data file 212 into web page storage 108y. Copies of data file 212 and index file 214 now reside on server 120y web page storage 108y. In one embodiment, data file 212 and index file 214 are implemented as static web pages that can be retrieved via a HyperText Transfer Protocol (HTTP, the standard protocol for the Internet) request. Steps 4.1 through 4.5 occur on all servers in server group 102, including server 120z, such that all servers in server group 102 have updated copies of data file 212 and index file 214 in respective web page storage areas.

Figure 5:
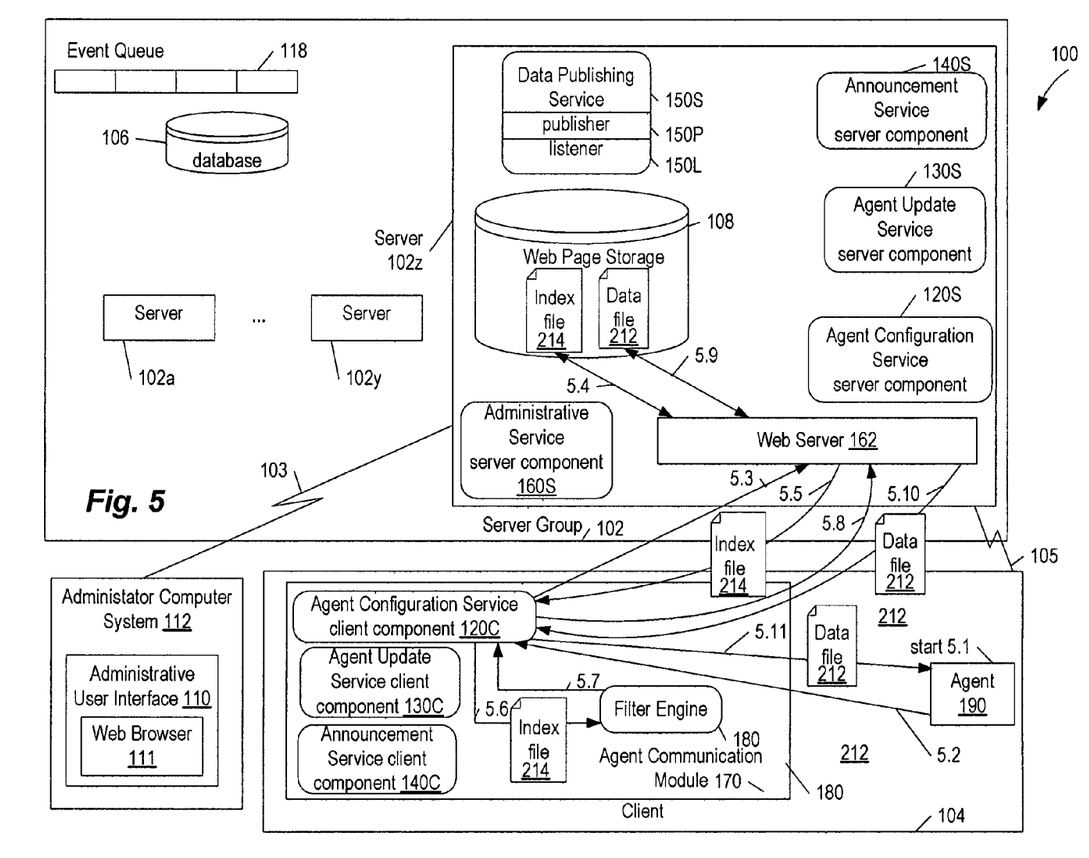
FIG. 5 shows examples of data flows distributing the data file to clients/agents of the large-scale distributed client/server system of FIG. 1.

FIG. 5 shows examples of data flows distributing data to client computer systems and agents of the large-scale data distribution system 100. Typically, when a client application such as agent 190 is started, the client application/agent reads a configuration data file. Client applications/agents often first acquire configuration data when initially installed; for example, some values for configuration data may be included in the installation program for the client application/agent, and other values for configuration data may be identified by the user during installation.

Assume that agent 190 is configured to automatically check for updated configuration data when agent 190 is started. In action 5.1, agent 190 is started. In action 5.2, agent 190 calls a function provided by Agent Configuration Service client component 120C to check for updated configuration data. In one embodiment, agent communication module 170 calls a function provided by an application programming interface (API) represented by Agent Configuration Service client component 120C, which was provided by the service provider with software for agent 190.

In action 5.3, the function call to Agent Configuration Service client component 120C calls web server 162 requesting a pre-determined web page to check for configuration data. Each service within agent communication module 170 has a specific, pre-determined web page to request. For Agent Configuration Service client component 120C, this pre-determined web page is a static web page at the location of index file 214 in web page storage 108.

In one embodiment, the pre-determined web page is obtained by examining an entry for the Agent Configuration Service in a Service Point Map. The Service Point Map entry for the Agent Configuration Service points to a Uniform Resource Locator (URL), in this case a URL for index file 214, managed by the Agent Configuration Service. Service Point Maps are described in further detail in the "Service Point Map" section of the "Broadband Service Control Network" patent application and in the "Distributed Services Architecture through use of a Dynamic Service Point Map" patent application described in the "Cross-References to Related Applications" section of this document.

In one embodiment, a request for the index file is implemented using an HTTP get-if-modified-since command. Web server 162 is configured to ensure that index file 214 and data file 212 are located at pre-specified locations. If index file 214 has not been updated, index file 214 is not transmitted across connection 105, thereby saving bandwidth.

Figure 6:
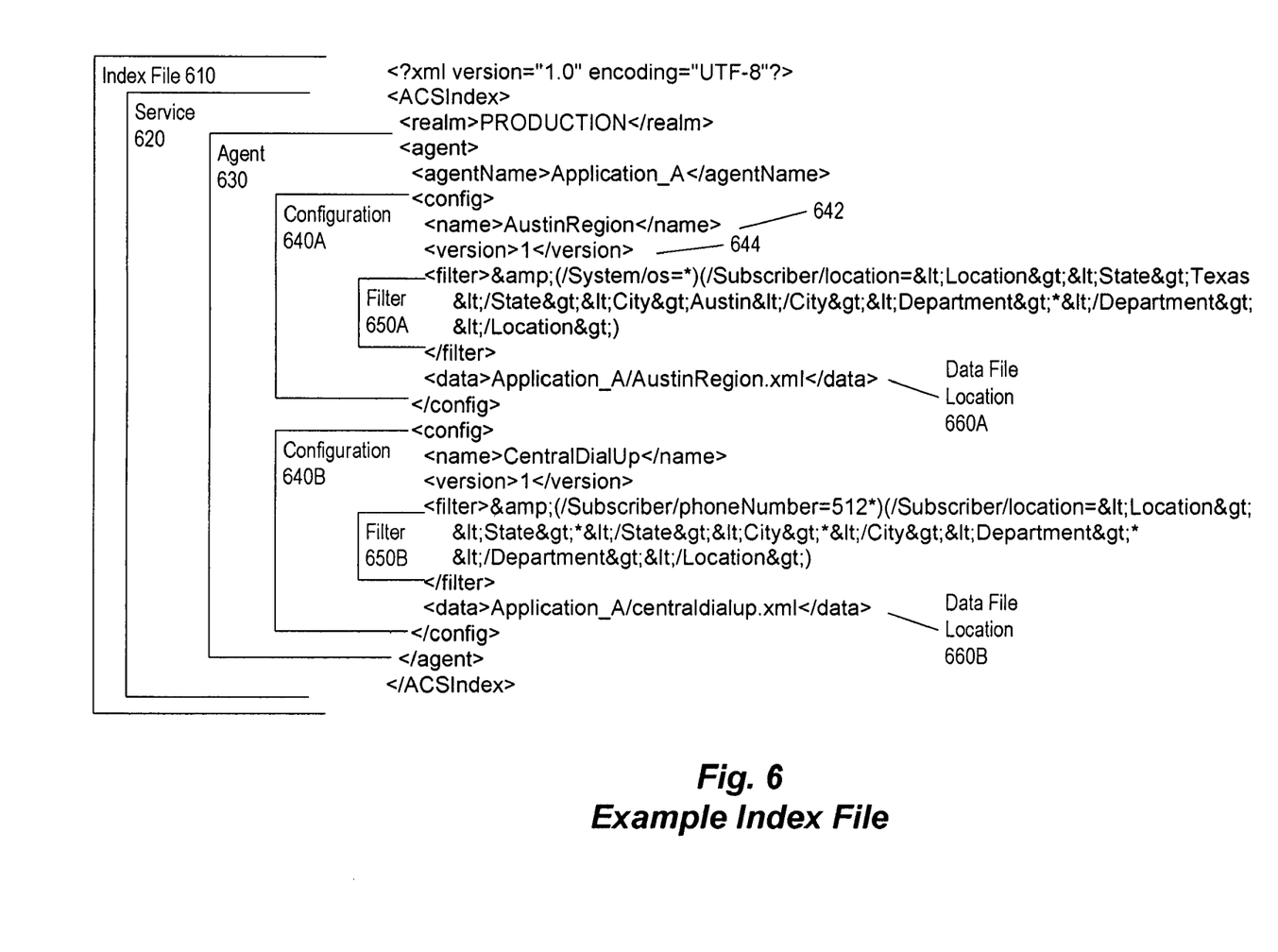
FIG. 6 shows an example of an index file.

Index file 214 is requested first, rather than data file 212, to minimize the amount of data transferred across the network. If each of millions of client computer systems were to request a copy of data file 212, transfers of large data files would likely overwhelm the network. However, index file 214, an example of which is shown in FIG. 6, is typically much smaller than data file 212. Requesting index file 214 and processing it on client computer system 104 to determine whether data file 212 should be requested provides significant bandwidth savings and much greater scalability of data distribution system 110.

In the embodiment using the HTTP get-if-modified-since command, if index file 214 has been updated after a specified time, this update indicates that the respective data file 212 to be distributed has changed since that time. In action 5.4, index file 214 is retrieved from web page storage 108. In action 5.5, web server 162 then provides index file 214 to the requesting Agent Configuration Service client component 120C. Index file 214 is considered to be updated both when index file 214 is first created and when index file 214 is modified.

When the requesting service client component, such as one of service client components 120C, 130C, and 140C, receives index file 214, the index file is processed to determine whether to request data file 212. In the embodiment shown in FIG. 5, the index file is processed by filter engine 180. In action 5.6, index file 214 is made available to filter engine 180. Processing index file 214 by filter engine 180 determines whether agent 190 meets filtering criteria specified in index file 214 and, if so, determines that data file 212 should be requested. The structure of an index file is illustrated in FIG. 6 and described below, followed by further discussion of processing the index file by the filter engine.

FIG. 6 shows an example of an index file. The index file includes filtering criteria. The filtering criterion is processed by each client that receives the index file. Each client, in response to processing the filtering criteria, determines whether it should request from the server group 102 a data file corresponding to the index file. In the embodiment shown, index file 610 is represented as a document written in eXtended Markup Language (XML), an extension of Hypertext Markup Language (HTML) used for specifying documents for transfer by HTTP, although other implementations of index files are within the scope of the invention. Index file 610 includes a service criterion 620 describing the service to which corresponding data are related; in this case, service criterion 620 describes Agent Configuration Service (abbreviated ACS). For the service indicated by service criterion 620, index file 610 further includes an agent criterion 630 identifying the specific agent(s)/application(s) to which the corresponding data are related. All or a subset of instances of the agents/applications distributed in system 100 may receive a copy of index file 610. For the agent specified by agent criterion 630, two configuration data files are described, respectively, by configuration criterion 640A and configuration criterion 640B.

Each of configuration criterion 640A and 640B provides a respective filter criterion 650A or 650B to describe specific properties of agents to which the corresponding data apply. Finally, each of configuration criterion 640A and 640B provides the respective data file location 660A or 660B for the corresponding data file. Only agents that have the specific properties described by the respective filter criterion 650A or 650B should request the corresponding data file at location 660A or 660B.

Returning to FIG. 5, in action 5.7, filter engine 180 processes data of the index file to determine whether data file 212 should be downloaded to client computer 104. In one embodiment, filter engine 180 processes the index file to determine if agent 190 satisfies the filtering criteria for one configuration in the index file. If filter 180 determines that agent 190 satisfies the filtering criteria for one configuration in the index file, then filter 180 generates a positive result indicating that data file 212 should be requested and subsequently downloaded to client 104. This positive result is provided to Agent Configuration Service client component 120C. The result may also include the location (e.g., data file location 660A) of data file 212. If filter engine 180 determines that agent 190 does not meet the filtering criteria for one configuration in index file 214, a negative result is returned to Agent Configuration Service client component 120C.

In one embodiment, a configuration name, such as configuration name 642, and a configuration version number, such as version number 644, uniquely identify a configuration in the index file. Other types of services also have identifiers delimiting respective information for data to be distributed. For configuration data, filter engine 180 searches for configurations that have not been processed. When a new configuration is encountered, filter engine 180 examines the filter criterion for the configuration to determine whether the configuration data are applicable to the corresponding agent 190. The filter describes a set of criteria that the agent 190 and/or hosting client computer system 104 should satisfy to download the corresponding configuration data. Filter engine 180 compares the filter criteria to a set of data about the agent 190 and/or client computer 104. This set of agent data can be maintained locally on the client computer system 104 and/or on server 120z in a Profile for the agent (as described in the "Profile" section of the "Broadband Service Control Network" application described in the "Cross References to Related Applications" section of this document).

Referring back to FIG. 5, assume that filter engine 180 indicates that agent 190 meets filtering criteria specified in index file 214 and should obtain data file 212 from web page storage 108. In action 5.8, Agent Configuration Service client component 120C requests the static web page stored at the location of data file 212 in web page storage 108 from web server 162. In action 5.9, web server 162 obtains data file 212 from web page storage 108, and in action 5.10, web server 162 provides data file 212 to Agent Configuration Service client component 120C. In action 5.11, Agent Configuration Service client component 120C makes data file 212 available to agent 190. Agent 190 may then persistently store data file 212 as configuration data on client computer system 104.

In one embodiment, the URLs for service server components are made available to service client components as described in the "Service Point Map" section of the "Broadband Service Control Network" and "Distributed Services Architecture through use of a Dynamic Service Point Map" patent applications described in the "Cross-References to Related Applications" section of this document.

In one embodiment, Agent Configuration Service client component 120C posts an acknowledgement message indicating that data file 212 has been received by Agent Configuration Service server component 120S. In this case, a pointer to an entry point to Agent Configuration Services server component 120S for acknowledgements is obtained from the Service Point Map described above. The acknowledgement message may include a receipt code indicating success or failure of the receipt of data file 212. The corresponding Agent Configuration Service server component 120S archives the receipt code in database 106, using a technique described in the "Profile" section of the "Broadband Service Control Network" patent application described in the "Cross-References to Related Applications" section of this document. Receipt codes can be used to identify agents that have successfully received data file 212 and/or agents that encountered a problem with data file 212. Based upon the receipt notifications, agents that did not receive data file 212 successfully can be targeted for subsequent re-distribution.

Agent Update Service

Agent Update Service server component 130S makes available agent installation software and/or updates to the agent 190 software for retrieval by Agent Update Service client component 130C. In one embodiment, the agent software includes plug-in agents, as described in patent application Ser. No. 09/542,274, entitled "Self-Managing Software Agents with Introspection," referenced in the "Cross-References to Related Applications" section of this document.

Agent Update Service allows an Administrator to provide an executable program to a set of applicable agents, such as agent 190. Upon receipt of the executable program, Agent Update Service client component 130C causes the executable program to be run, resulting in new or replacement software and/or data being installed on the client computer system 104. Typically, agent communication module 170 obtains the user's permission to run the executable program via a graphical user interface (GUI). The text for the permission request presented by this GUI can be retrieved independently from the server. Permission requests can be customized for a particular agent profile. For example, an agent running on a computer system in Texas can be targeted to receive an English message, whereas an agent running on a computer system in France can present a message in French. The text to be presented in the permission request can be distributed as a separate text file in the same manner that index file 214 and data file 212 are distributed, as described in FIGS. 2-6.

Executable programs can replace agent software, or they can update an individual component (or "plug-in") of the software for agent 190, as described in patent application Ser. No. 09/542,274, entitled "Self Managing Software Agents with Introspection" described in the "Cross References to Related Applications" section of this document. This patent application describes agents that can identify additional modules that must be present for the pending update to be performed successfully. The Agent Update Service provides the functionality enabling Administrators to target updates to selected agents.

Targeting and distribution of an update is handled using an index file, a filter engine, and a Data Publishing Service, in a manner similar to that described for configuration data with reference to FIGS. 2-6. The Agent Update Service may also post an acknowledgement to the server upon completion of the update, to be noted in the Profile for the agent, as described in the "Profile" section of the "Broadband Service Control Network" patent application described in the "Cross-References to Related Applications" section of this document.

Announcements Service

Announcement Service server component 140S makes announcements available for retrieval by Announcement Service client component 140C. The Announcement Service allows an administrator to produce a text message and provide the message to a set of the client computer systems running agents. Announcement Service 140S differs from an e-mail service in that e-mail is targeted at specific users, either directly using the users' email addresses or indirectly using mailing lists. The Announcement Service allows an administrator to target users based on characteristics of their client computer system and/or broadband service account, rather than requiring the administrator to identify the mailing address for each user to receive the announcement. For example, recipients of announcements can be based upon the location of the user as identified in the agent profile, rather than requiring the administrator to identify all users' e-mail addresses at that location.

At the receiving client computer system, the announcement can be provided to the user via a user interface provided by the agent. Typically, an indicator changes in the context of the agent, indicating that a new message is available. The user can then view the message from the agent. Announcements can contain formatted text, graphics, and hyperlinks.

In one embodiment, delivery of an announcement to a given client computer system may be delayed until an appropriate time. A process continuously runs on the client computer system and watches for incoming announcements. If an announcement is detected, the process can either launch the targeted agent or save the announcement for the next time the agent is started. In one embodiment, this choice is configurable by an administrator for the agent.

Targeting and distribution of an Announcement is handled using an index file, a filter engine, and the Data Publishing Service, in a manner similar to that described for the Agent Configuration Service in FIGS. 2-5.

Other Embodiments

The foregoing describes an embodiment wherein some components are contained within other components (e.g., web browser 111 of Administrative Interface 110 in FIGS. 1-5). It is to be understood that such depicted architectures are merely examples; in fact, many other architectures can be implemented that achieve the same functionality. Any arrangement of components to achieve the same functionality is effectively "associated" such that the desired functionality is achieved.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future. Transmission type media are a different set of items than computer readable media.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs, such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method for distributing data to a plurality of agents in an distributed services network, comprising:
  receiving a first request from a requesting instance of a plurality of instances of an agent application configured to accept a service selected from the group consisting of a registration service, a profile data management service, a login service, an agent connection status service, a plug-in management service, a subscriber profile management service, a service point map service, a profile management service, an administrative service, a data publishing service, an announcement service, and an agent configuration service;
  in response to receiving the first request, transmitting an index file to the requesting instance, wherein the index file is configurable to:
    identify a service supported by the requesting instance;
    provide to the requesting instance a filter criterion configured to enable the requesting instance to recognize that the index file is applicable thereto; and
    provide a location of first data accessible to the requesting instance;
  receiving a second request from the requesting instance that is generated by the requesting instance in response to a filter engine associated with the requesting instance determining that the requesting instance is identified by the criterion; and
  in response to receiving the second request, transmitting the first data to the requesting instance.

2. The method of claim 1 wherein the index file is transmitted to the requesting instance when second data associated with the criterion and the location is updated.

3. The method of claim 1 wherein the index file is transmitted to the requesting instance after second data associated with the criterion and the location is updated and after a predetermined amount of time has passed since the second data was updated.

4. The method of claim 1 further comprising:
  receiving a message indicating whether the first data was received.

5. The method of claim 4 further comprising:
  retransmitting the first data upon request by the requesting instance when the message indicates that an error occurred in response to transmitting the first data.

6. The method of claim 1 wherein
  the first data comprise configuration data for each of the set of instances of the application.

7. The method of claim 1 wherein the first data comprise an announcement to be sent to each of the set of instances of the application.

8. The method of claim 1, wherein the index file is implemented as XML instructions.

9. The method of claim 1, wherein the criterion is at least a portion of a telephone number.

10. The method of claim 1, wherein the criterion is a state.

11. The method of claim 1, wherein the criterion is a city.

12. The method of claim 1, wherein the criterion is a building location.

13. The method of claim 1, wherein the criterion is a department.

14. A system comprising:
   first means for transmitting an index file, the index file comprising:
      a service criterion selected from a service group consisting of a registration service, a profile data management service, a login service, an agent connection status service, a plug-in management service, a subscriber profile management service, a service point map service, a profile management service, an administrative service, a data publishing service, an announcement service, and an agent configuration service; and
      a location of first data;
      wherein the first means transmits the index file in response to receiving a first request from a requesting instance of a plurality of instances of an agent application configured to accept a service selected from the service group; and
   second means for transmitting the first data to the requesting instance in response to receiving a second request from the requesting instance for the first data.

15. The system of claim 14 further comprising:
   receiving means for receiving a message indicating whether the first data was received.

16. The system of claim 15 further comprising:
   third means for retransmitting the first data again upon request by the requesting instance when the message indicates that an error occurred in receiving the first data.

17. The system of claim 14, wherein the index file includes a filter criterion that is at least a portion of a telephone number.

18. The system of claim 14, wherein the index file includes a filter criterion that is a state.

19. The system of claim 14, wherein the index file includes a filter criterion that is a city.

20. A computer-readable medium comprising:
   first instructions to transmit an index file in response to receiving a first request from a requesting instance of a plurality of instances of an agent application, the index file being configurable to:
      identify a service supported by the requesting instance, the service being selected from the group consisting of a registration service, a profile data management service, a login service, an agent connection status service, a plug-in management service, a subscriber profile management service, a service point map service, a profile management service, an administrative service, a data publishing service, an announcement service, and an agent configuration service;
      provide to the requesting instance a filter criterion configured to enable the requesting instance to recognize that the index file is applicable thereto; and
      provide a location of first data accessible to the requesting instance, and and
   second instructions to transmit the first data to the requesting instance in response to receiving a second request from the requesting instance for the first data.

21. The computer-readable medium of claim 20 further comprising:
   receiving instructions to receive a message indicating whether the first data was received.

22. The computer-readable medium of claim 20 further comprising:
   third instructions to retransmit the first data upon request by the requesting instance when the message indicates that an error occurred in receiving the first data.

23. The computer-readable medium of claim 20, wherein the criterion is at least a portion of a telephone number.

24. The computer-readable medium of claim 20, wherein the criterion is a state.

25. The computer-readable medium of claim 20, wherein the criterion is a city.

26. A computer readable medium for storing instructions executable by a first computer system,
   wherein a method of distributing data to a plurality of agents in a distributed services network is performed by the first computer system in response to executing the instructions, the method comprising the first computer system transmitting an index file to each of a plurality of second computer systems,
   wherein the index file is configurable to:
      identify a service supported by the requesting instance, the service being selected from the group consisting of a registration service, a profile data management service, a login service, an agent connection status service, a plug-in management service, a subscriber profile management service, a service point map service, a profile management service, an administrative service, a data publishing service, an announcement service, and an agent configuration service,
      provide to the requesting instance criteria configured to enable the requesting instance to recognize that the index file is applicable thereto; and
      provide a location of a data file accessible to the requesting instance,
   wherein the index file is processable by an agent application running on each of the plurality of second computer systems to determine whether that second computer system should receive the data file stored at the location identified by the index file.

27. The computer readable medium of claim 26 wherein the plurality of second computer systems is a subset of computer systems coupled to the first computer system.

28. The computer readable medium of claim 26 further comprising the first computer system transmitting the data file to one of the plurality of second computer systems in response to the first computer system receiving a request from the one of the plurality of second computer systems, wherein the first computer system receives the request after transmitting the index file to the one of the plurality of second computer systems.

29. A method for distributing data to a plurality of instances of an agent application over a distributed services network, comprising:
   receiving a first request from a first requesting instance of a plurality of instances of the agent application, the first requesting instance running on a first client computer system;
   receiving a second request from a second requesting instance of said plurality, the second requesting instance running on a second client computer system;

transmitting, in response to receiving the first request, an index file to the first requesting instance, and transmitting, in response to receiving the second request, the index file to the second requesting instance, wherein the index file includes filtering criteria that identify the first requesting instance according to characteristics of the first client computer system and/or a broadband service account associated with the first client computer system, but fail to identify the second requesting instance according to characteristics of the second client computer system and/or a broadband service account associated with the second client computer system;

receiving a third request from the first requesting instance that the first requesting instance generates in response to a filter engine associated therewith determining that the filtering criteria identify the first requesting instance; and in response to receiving the third request, transmitting to the first requesting instance first data identified in the index file.

30. The method as recited in claim 29, wherein the transmitting of the first data causes the first requesting instance to be configured differently than the second requesting instance.

31. The method as recited in claim 29, wherein said filtering criteria include a service criterion selected form the group consisting of a registration service, a profile data management service, a login service, an agent connection status service, a plug-in management service, a subscriber profile management service, a message posting service, a service point map service, a profile management service, an administrative service, a data publishing service, and an agent configuration service.

* * * * *